United States Patent
Sternberger et al.

(10) Patent No.: US 7,878,451 B2
(45) Date of Patent: Feb. 1, 2011

(54) LOW-LEAKAGE SEAL SYSTEM FOR PIVOT DOOR TYPE THRUST REVERSER

(75) Inventors: Joe E. Sternberger, Wichita, KS (US); Andrew R. Croskey, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 706 days.

(21) Appl. No.: 11/940,717

(22) Filed: Nov. 15, 2007

(65) Prior Publication Data

US 2009/0127806 A1 May 21, 2009

(51) Int. Cl.
*F02K 1/32* (2006.01)
(52) U.S. Cl. ............... 244/110 B; 239/265.31; 60/226.2
(58) Field of Classification Search ............. 244/110 B; 60/226.2; 239/265.11, 365.31, 265.33, 265.39, 239/265.37
See application file for complete search history.

(56) References Cited

U.S. PATENT DOCUMENTS

| | | | |
|---|---|---|---|
| 5,243,817 A | 9/1993 | Matthias | |
| 5,267,438 A | 12/1993 | Bunel et al. | |
| 5,875,995 A * | 3/1999 | Moe et al. | 244/110 B |
| 5,913,476 A * | 6/1999 | Gonidec et al. | 239/265.31 |
| 6,216,980 B1 * | 4/2001 | Baudu et al. | 244/110 B |
| 6,487,845 B1 * | 12/2002 | Modglin et al. | 60/226.2 |
| 6,895,742 B2 * | 5/2005 | Lair et al. | 60/226.2 |
| 2010/0044466 A1 * | 2/2010 | Vauchel et al. | 239/265.11 |

* cited by examiner

*Primary Examiner*—Tien Dinh
(74) *Attorney, Agent, or Firm*—Hovey Williams LLP

(57) ABSTRACT

A low-leakage seal system for a pivot door type thrust reverser comprises a forward seal, an aft seal, and a pair of seal stops. The forward seal is attached to a forward portion of a thrust reverser. The aft seal is attached to an aft portion of the pivot door. The seal stops are attached to opposing sides of the pivot door and each seal stop couples with a pivot door hinge pin. Each seal stop includes a forward tab and an aft tab. The forward tabs of the seal stops make flush contact with the forward seal and the aft tabs make flush contact with the aft seal such that a continuous seal is formed between the pivot door and the fixed structure of the thrust reverser when the pivot door is stowed.

20 Claims, 4 Drawing Sheets

LOW-LEAKAGE SEAL SYSTEM FOR PIVOT DOOR TYPE THRUST REVERSER

BACKGROUND OF THE INVENTION

1. Field of the Invention

Embodiments of the present invention relate to a seal system for a pivot door type thrust reverser. More particularly, embodiments of the present invention relate to a seal system that provides a continuous seal between the thrust reverser pivot door and the frame of the engine nacelle.

2. Description of the Related Art

Airplane engines incorporated on business or regional jets often include pivot door type thrust reversers. When reverse thrust is not required, the pivots doors are stowed, or closed. In order to maintain engine performance, a good seal between the pivot door in the stowed position and the fixed structure of the engine nacelle is required. Typically, there is a seal that is attached to the perimeter of the pivot door opening on the fixed structure of the nacelle. The seal may terminate in the proximity of the pivot door hinge pin. However, the seal is not continuous as it does not form a bond with the pivot door hinge pin. As a result, there may be a loss of engine performance leading to an increase in fuel consumption and a reduction in the range of the airplane.

SUMMARY OF THE INVENTION

Embodiments of the present invention solve the above-mentioned problems and provide a distinct advance in the art of seals between a thrust reverser pivot door and the fixed structure of an engine. More particularly, embodiments of the invention provide a seal between a thrust reverser pivot door and the fixed structure of an engine that is continuous and forms a seal with the pivot door hinge pin when the pivot door is in the stowed position.

Various embodiments of the seal system comprise a forward seal, an aft seal, and a pair of seal stops. The forward seal is somewhat tubular, with a bulb-type circular cross section, and is attached to the forward portion of the frame at the perimeter of the opening in the nacelle for the pivot door. The forward seal originates and terminates on the forward side and above the pivot door hinge pin. The endpoints of the forward seal are angled backward with respect to a vertical axis.

The aft seal is somewhat tubular, with a bulb-type cross section, and is attached to the aft section of the perimeter of the pivot door, although the aft seal could also be attached to the aft section of the frame at the pivot door opening. The aft seal originates and terminates on the aft side and below the pivot door hinge pin. The endpoints are angled forward with respect to a vertical axis.

The seal stops are attached to opposing sides of the pivot door and couple with each pivot door hinge pin. Each seal stop includes a forward tab and an aft tab. The two tabs are roughly the same size and shape as the forward and aft seals. The forward tab is located near the top and on the forward side of the seal stop in order to align with and contact one endpoint of the forward seal when the pivot door is in the stowed position. The aft tab is located near the bottom and on the aft side of the seal stop in order to align with and contact one endpoint of the aft seal when the pivot door is in the stowed position. The endpoints of the two tabs are angled so as to be supplementary to the endpoints of the forward and aft seals, thus when the pivot door is stowed, the endpoints of the seal stop tabs make flush contact with the endpoints of the forward and aft seals, forming a continuous seal between the pivot door and the frame of the engine. Furthermore, the angled nature of the seal stop forward tab and the endpoints of the forward seal avoids any scrubbing action as the pivot doors are deployed, which reduces wear on the seals.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 7:
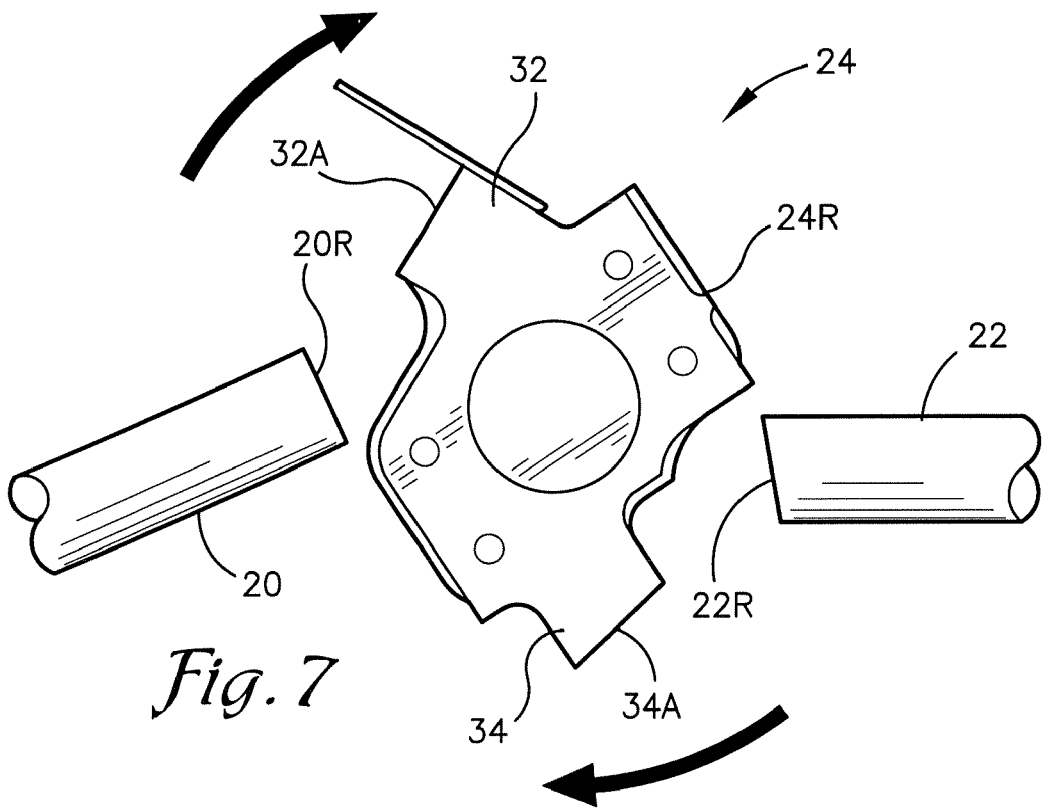
Figure 8:
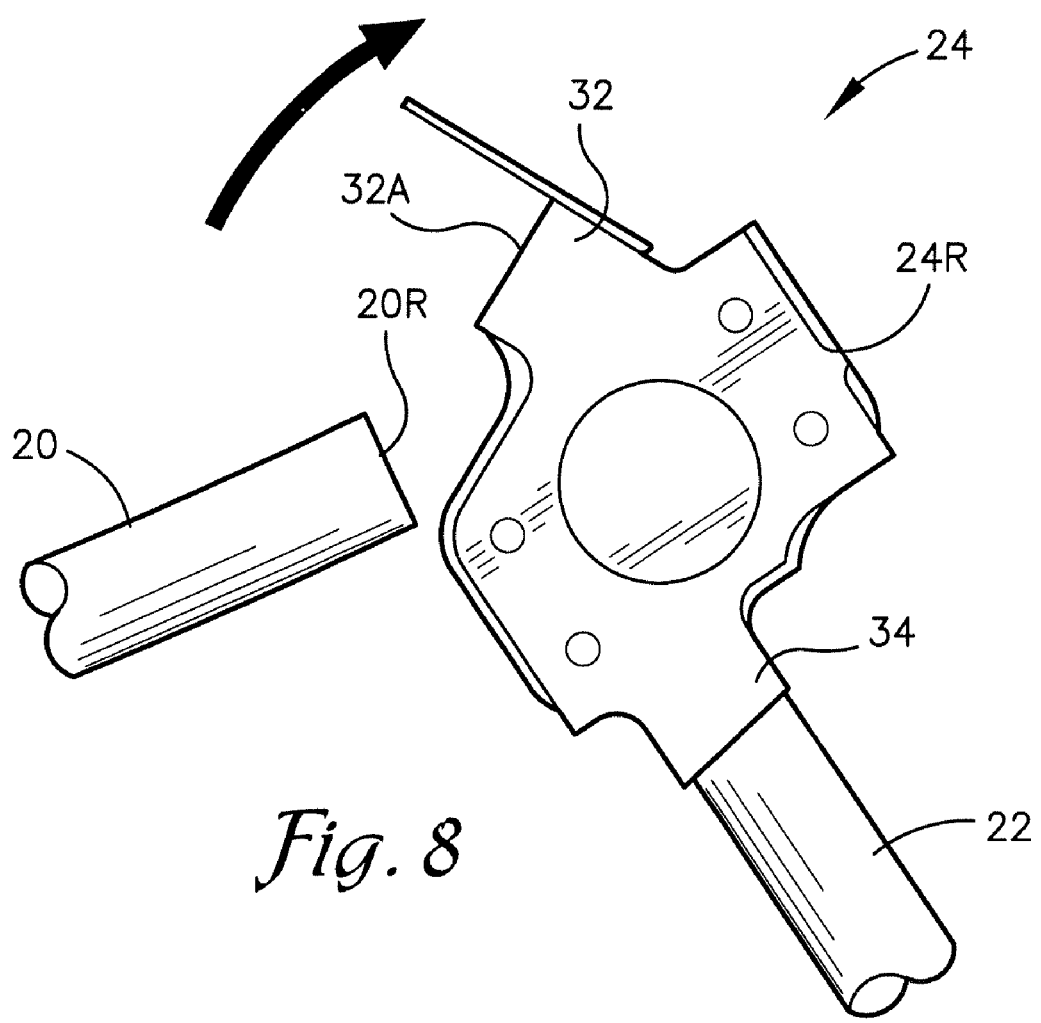

FIG. 7 is a plan view of the forward seal, the seal stop, and the aft seal when the pivot door is deployed in accordance with the embodiment that includes the aft seal being attached to the aft bulkhead; and FIG. 8 is a plan view of the forward seal, the seal stop, and the aft seal when the pivot door is deployed in accordance with the embodiment that includes the aft seal being attached to the aft portion of the pivot door.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In various embodiments, as seen in FIG. 1 through FIG. 5, the seal system 10 is operable to maintain a continuous bond between a thrust reverser pivot door 12, an aft bulkhead 14, and an aft fan duct 18 of a thrust reverser 16 when the pivot door 12 is in the stowed position. Since the forward section of the pivot doors 12 pivots outward (away from the center of the thrust reverser 16), the forward portion of the bond occurs between the inner side of the pivot door 12, the aft bulkhead 14, and side beams 26 of the thrust reverser 16. Likewise, since the aft section of the pivot doors 12 pivots inward (toward the center of the thrust reverser 16), the aft portion of the bond occurs between the outer side of the pivot door 12 and an aft fan duct 18. The seal system 10 comprises a forward seal 20, an aft seal 22, and a pair of seal stops 24.

Figure 1:
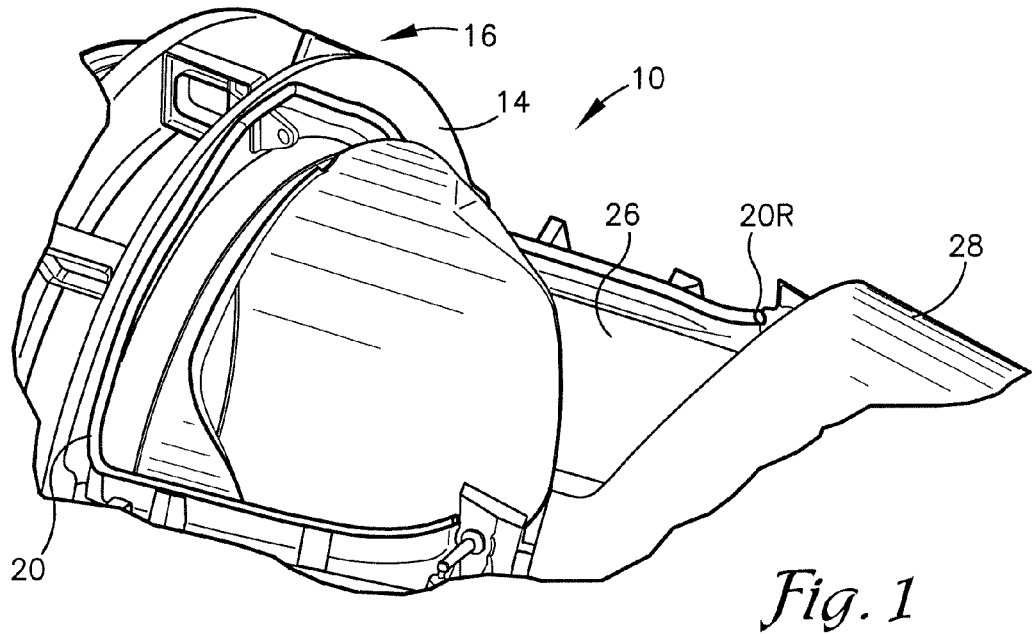
FIG. 1 is a perspective view of a seal system constructed in accordance with various embodiments of the present invention.
Figure 2:
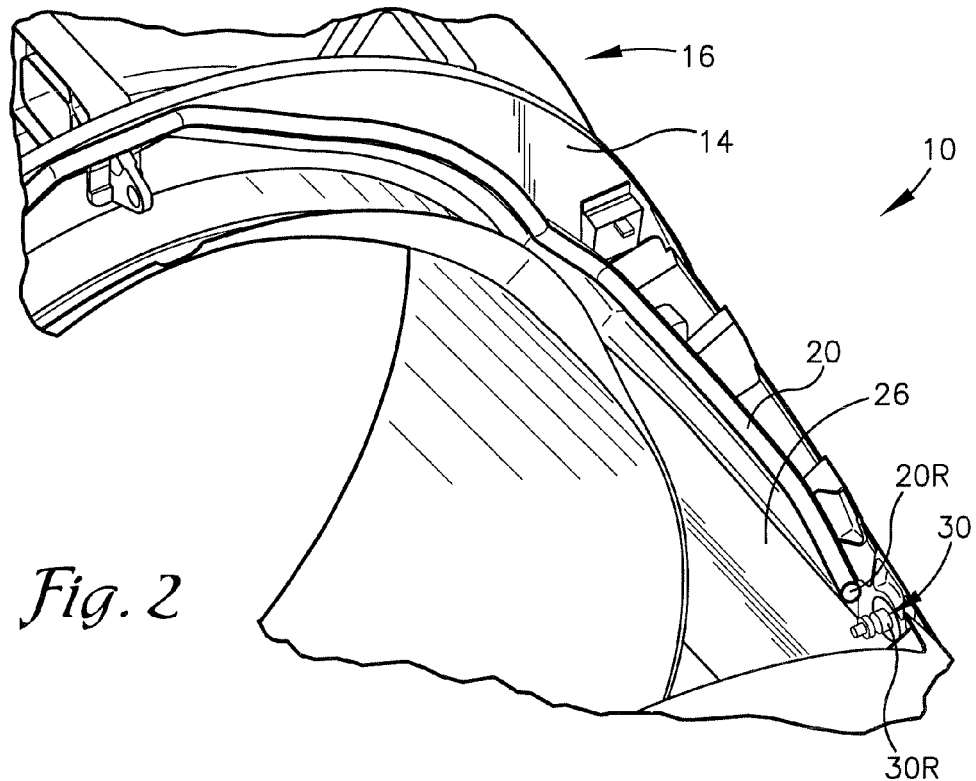
FIG. 2 is a perspective view of a forward seal portion of the seal system.

In various embodiments, as seen in FIG. 1 and FIG. 2, the forward seal 20 is somewhat tubular in shape, with a bulb-type cross section, and may be manufactured from a molded material with a hollow core that is bound by cloth which may include holes from the exterior to the core for the purposes of pressurization and re-energizing the seal 20. The forward seal 20 is attached to a side beam 26 and the aft bulkhead 14 around the perimeter of the opening in a nacelle 28 for the pivot door 12 mechanically with fasteners. One endpoint 20L (not shown) of the forward seal 20 is coupled to a left side beam 26L (not shown) just forward of and above a left pivot door hinge pin 30L (not shown). The other endpoint 20R of the forward seal 20 is coupled to a right side beam 26R just forward of and above a right pivot door hinge pin 30R. Endpoint 20L, side beam 26L, and hinge pin 30L may not be shown in the figures, but these components are identical to endpoint 20R, side beam 26R, and hinge pin 30R, which are shown. The endpoints 20L, 20R are angled backward with respect to a vertical axis in order to couple with the seal stops 24 when the pivot door 12 is stowed.

Figure 3:
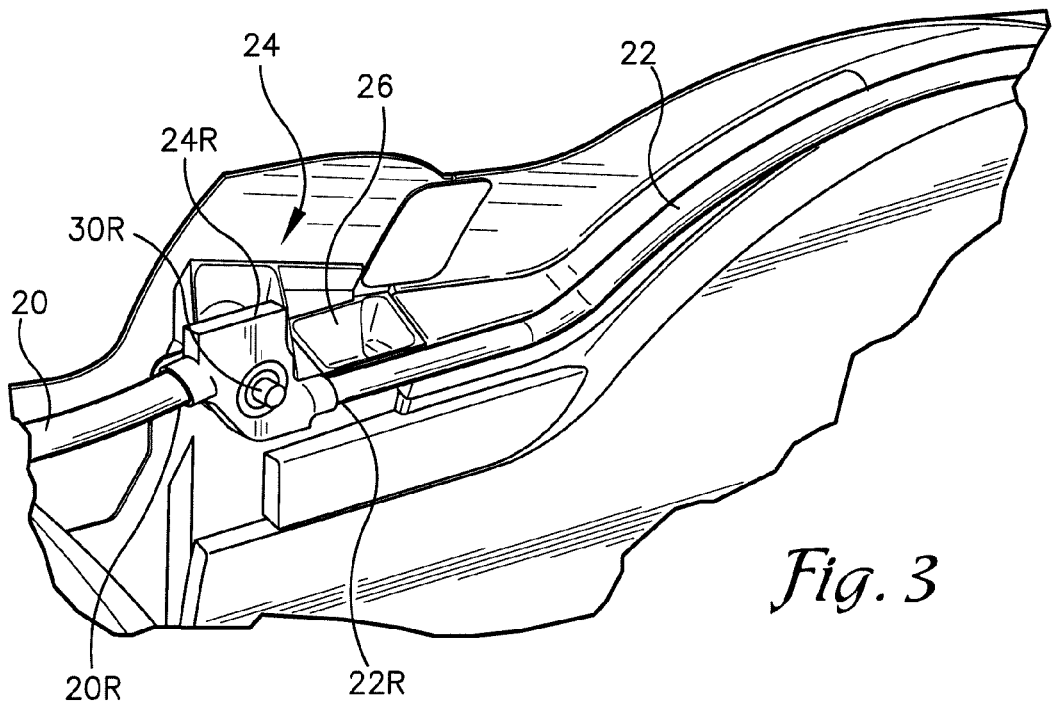
FIG. 3 is a perspective view of the forward seal, an aft seal portion of the seal system, and a seal stop portion of the seal system.
Figure 4:
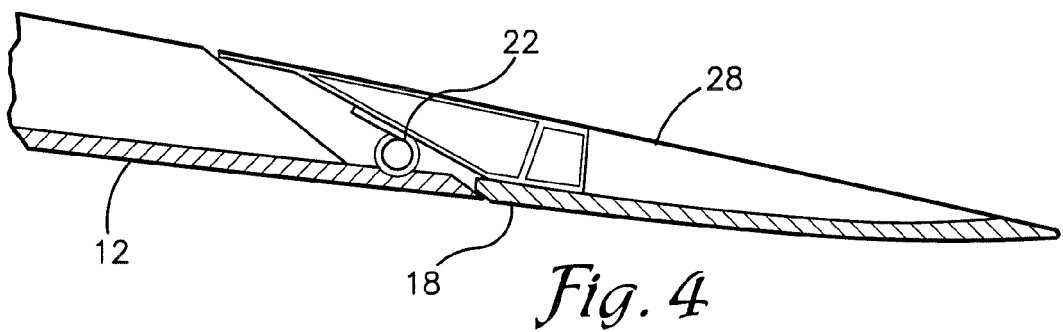
FIG. 4 is a cross-sectional view of the aft portion of a pivot door and an aft fan duct depicting the aft seal attached to the aft fan duct.

In various embodiments, as seen in FIG. 3, the aft seal 22 is somewhat tubular in shape, with a bulb-type cross section, and may be manufactured from a molded material with a hollow core that is bound by cloth which may include holes from the exterior to the core for the purposes of pressurization and re-energizing the seal 22. In certain embodiments, as seen in FIG. 4, the aft seal 22 is attached to the aft section of the side beam 26 and the interior of an aft fan duct 18. The aft seal 22 may be attached to the side beam 26 and the aft fan duct 18 mechanically with fasteners. One endpoint 22L (not shown) of the aft seal 22 is coupled to a left side beam 26L just aft of and below a left pivot door hinge pin 30L. The other endpoint 22R of the aft seal 22 is coupled to a right side beam 26R just aft of and below a right pivot door hinge pin 30R. Endpoint 22L is identical to endpoint 22R. The endpoints 22L, 22R are angled forward with respect to a vertical axis in order to couple with the seal stops 24 when the pivot door 12 is stowed. The endpoints 22L, 22R remain stationary when the pivot door 12 rotates during deployment.

Figure 5:
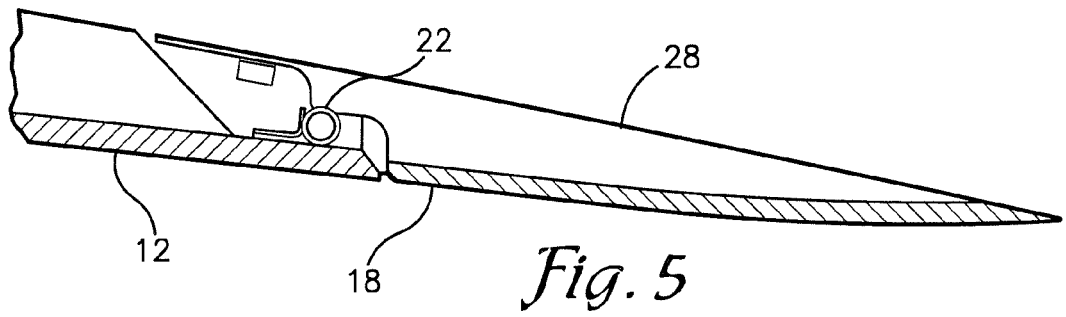
FIG. 5 is a cross-sectional view of the aft portion of the pivot door and aft fan duct depicting the aft seal attached to the aft portion of the pivot door.

In other embodiments, as seen in FIG. 5, the aft seal 22 is attached to the aft section of the perimeter on the outer side of the pivot door 12 and may be attached mechanically with fasteners. One endpoint 22L of the aft seal 22 is coupled to the middle section of the interior perimeter of the left side of the pivot door 12 just aft of and below the left pivot door hinge pin 30L. The other endpoint 22R is coupled to the middle section of the interior perimeter of the right side of the pivot door 12 just aft of and below the right pivot door hinge pin 30R. The endpoints 22L, 22R are angled forward with respect to a vertical axis in order to couple with the seal stops 24 when the pivot door 12 is stowed. The endpoints 22L, 22R rotate with the seal stops 24 when the pivot door 12 rotates during deployment.

Figure 6:
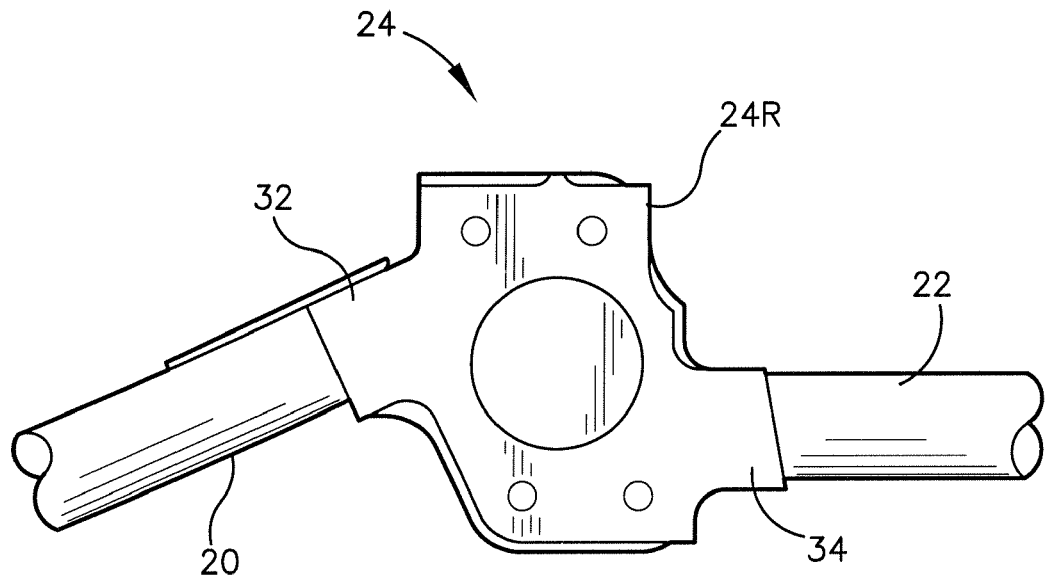
FIG. 6 is a plan view of the forward seal, the seal stop, and the aft seal when the pivot door is stowed.

In various embodiments, the seal stops 24L, 24R are attached to opposing left and right sides of the pivot door 12 and couple with each pivot door hinge pin 30L, 30R, respectively. Seal stop 24L, which is not shown, is the mirror image to seal stop 24R, which is shown in FIG. 3 and FIG. 6-FIG. 8. As seen in FIG. 6, each seal stop 24 includes a forward tab 32 and an aft tab 34. The two tabs 32, 34 are roughly the same size and shape as the forward and aft seals 20, 22. The forward tab 32 is located near the top and on the forward side of the seal stop 24 in order to align with and contact one endpoint 20L, 20R of the forward seal 20 when the pivot door 12 is in the stowed position. The aft tab 34 is located near the bottom and on the aft side of the seal stop 24 in order to align with and contact one endpoint 22L, 22R of the aft seal 22 when the pivot door 12 is in the stowed position.

In various embodiments, the endpoint 32A of the forward tab 32 is slanted so as to form supplementary angle with the endpoint 20L, 20R of the forward seal 20. The endpoint 34A of the aft tab 34 is slanted so as to form a supplementary angle with the endpoint 20L, 20R of the forward seal 20. Thus when the pivot door 12 is stowed, the endpoints 32A, 34A of the seal stop tabs 32, 34 make flush contact with the endpoints 20L, 20R, 22L, 22R of the forward and aft seals 20, 22, forming a continuous seal between the pivot door 12, the aft bulkhead 14, and side beams 26 of the thrust reverser 16. Furthermore, the angled nature of the interface between the endpoint 32A of the forward tab 32 and the forward seal endpoints 20L, 20R allows the seal stop 24 to rotate outward away from the forward seal 20 cleanly, without any scrubbing action as the pivot doors 12 are deployed, which reduces wear on the forward seal 20.

In certain embodiments, as seen in FIG. 7, in which the aft seal 22 is attached to the side beam 26 and the interior of the aft fan duct 18, the angled nature of the interface between the endpoint 34A of the aft tab 34 and the aft seal endpoints 22L, 22R allows the seal stop 24 to rotate inward away from the aft seal 22 cleanly, without any scrubbing action as the pivot doors 12 are deployed. In other embodiments, as seen in FIG. 8, in which the aft seal 22 is coupled to the middle section of the interior perimeter of the left and right sides of the pivot door 12, the aft seal 22 maintains flush contact with the aft tabs 34 of the seal stops 24 and the endpoints 22L, 22R rotate with the seal stop 24 as the pivot door 12 deploys.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A seal system for a pivot-door type thrust reverser, the seal system comprising:
    a forward seal, operable to provide temporary contact between a forward portion of a pivot door and a forward portion of a thrust reverser;
    an aft seal, operable to provide temporary contact between an aft portion of the pivot door and an aft portion of the thrust reverser; and
    a pair of seal stops, operable to provide continuity between the forward seal and the aft seal, the seal stops attached to opposing sides of the pivot door.

2. The seal system of claim 1, wherein the forward seal is attached to the forward portion of the thrust reverser.

3. The seal system of claim 2, wherein the forward seal originates and terminates on the forward side and above the pivot door hinge pin.

4. The seal system of claim 1, wherein the endpoints of the forward seal form a backward angle with respect to a vertical axis.

5. The seal system of claim 1, wherein the aft seal is attached to the aft portion of the thrust reverser.

6. The seal system of claim 5, wherein the aft seal originates and terminates on the aft side and below the pivot door hinge pin.

7. The seal system of claim 1, wherein the aft seal is attached to the aft portion of the pivot door.

8. The seal system of claim 1, wherein the endpoints of the aft seal form a forward angle with respect to a vertical axis.

9. The seal system of claim 1, wherein each seal stop couples with a pivot door hinge pin.

10. The seal system of claim 1, wherein each seal stop includes a forward tab and an aft tab, the forward tab and the aft tab being roughly the same size and shape as the forward seal and the aft seal, respectively.

11. The seal system of claim 10, wherein the forward tab is located near the top of the seal stop and on the forward side of the seal stop in order to align with one endpoint of the forward seal.

12. The seal system of claim 10, wherein the endpoint of the forward tab forms a forward angle with respect to a vertical axis that is supplemental to the backward angle of one endpoint of the forward seal such that the endpoint of the forward tab makes flush contact with one endpoint of the forward seal.

13. The seal system of claim 12, wherein the endpoint of the forward tab does not scrub the corresponding endpoint of the forward seal when the pivot door is deployed.

14. The seal system of claim 10, wherein the aft tab is located near the bottom of the seal stop and on the aft side of the seal stop in order to align with one endpoint of the aft seal.

15. The seal system of claim 10, wherein the endpoint of the aft tab forms a backward angle with respect to a vertical axis that is supplemental to the forward angle of one endpoint of the aft seal such that the endpoint of the aft tab makes flush contact with one endpoint of the aft seal.

16. A seal system for a pivot-door type thrust reverser, the seal system comprising:
 a forward seal, operable to provide temporary contact between a forward portion of a pivot door and a forward portion of an thrust reverser, the forward seal attached to the forward portion of the thrust reverser and originating and terminating on the forward side and above a pivot door hinge pin;
 an aft seal, operable to provide temporary contact between an aft portion of the pivot door and an aft portion of the thrust reverser, the aft seal attached to the aft portion of the pivot door and originating and terminating on the aft side and below the pivot door hinge pin; and
 a pair of seal stops, operable to provide continuity between the forward seal and the aft seal, the seal stops attached to opposing sides of the pivot door, each seal stop coupled with a pivot door hinge pin and including
  a forward tab, operable to align with one endpoint of the forward seal, and
  an aft tab, operable to align with one endpoint of the aft seal.

17. The seal system of claim 16, wherein the endpoints of the forward seal form a backward angle with respect to a vertical axis.

18. The seal system of claim 17, wherein the endpoint of the forward tab forms a forward angle with respect to a vertical axis that is supplemental to the backward angle of one endpoint of the forward seal such that the endpoint of the forward tab makes flush contact with one endpoint of the forward seal.

19. The seal system of claim 18, wherein the endpoint of the forward tab does not scrub the corresponding endpoint of the forward seal when the pivot door is deployed.

20. A seal system for a pivot-door type thrust reverser, the seal system comprising:
 a forward seal, operable to provide temporary contact between a forward portion of a pivot door and a forward portion of an thrust reverser, the forward seal attached to the forward portion of the thrust reverser, originating and terminating on the forward side and above a pivot door hinge pin, and including endpoints that form a backward angle with respect to a vertical axis;
 an aft seal, operable to provide temporary contact between an aft portion of the pivot door and an aft portion of the thrust reverser, the aft seal attached to the aft portion of the pivot door and originating and terminating on the aft side and below the pivot door hinge pin; and
 a pair of seal stops, operable to provide continuity between the forward seal and the aft seal, the seal stops attached to opposing sides of the pivot door, each seal stop coupled with a pivot door hinge pin and including
  a forward tab, operable to align with one endpoint of the forward seal and including an endpoint that forms a forward angle with respect to a vertical axis that is supplemental to the backward angle of one endpoint of the forward seal such that the endpoint of the forward tab makes flush contact with one endpoint of the forward seal, wherein the forward tab does not scrub the forward seal when the pivot door is deployed, and
  an aft tab, operable to align with one endpoint of the aft seal.

* * * * *